(12) United States Patent
Westercamp

(10) Patent No.: US 7,704,541 B1
(45) Date of Patent: Apr. 27, 2010

(54) STEAM CRUSHED WHOLE GRAINS

(75) Inventor: Robert T Westercamp, Cedar Rapids, IA (US)

(73) Assignee: General Mills, Inc., Minneapolis, MN (US)

( * ) Notice: Subject to any disclaimer, the term of this patent is extended or adjusted under 35 U.S.C. 154(b) by 1052 days.

(21) Appl. No.: 11/092,326

(22) Filed: Mar. 29, 2005

Related U.S. Application Data

(60) Provisional application No. 60/557,605, filed on Mar. 30, 2004.

(51) Int. Cl.
*A23P 1/00* (2006.01)

(52) U.S. Cl. .................. 426/627; 426/508; 426/510; 426/511; 426/518; 426/520

(58) Field of Classification Search ................ 426/615, 426/618–627, 506–508, 511, 518, 520, 455–464
See application file for complete search history.

(56) References Cited

U.S. PATENT DOCUMENTS

| | | | |
|---|---|---|---|
| 2,930,697 A | | 3/1960 | Miller |
| 3,887,714 A | | 6/1975 | Kelly et al. |
| 3,962,479 A | * | 6/1976 | Coldren ..................... 426/532 |
| 4,055,673 A | * | 10/1977 | Mueller et al. ............... 426/231 |
| 4,463,022 A | | 7/1984 | Sterner et al. |
| 4,707,371 A | | 11/1987 | Yamaguchi et al. |
| 4,844,936 A | | 7/1989 | Cox et al. |
| 4,847,103 A | | 7/1989 | Saita et al. |
| 5,198,253 A | | 3/1993 | Roskowiak et al. |
| 5,240,728 A | | 8/1993 | Grenet et al. |
| 6,025,011 A | * | 2/2000 | Wilkinson et al. .......... 426/622 |
| 6,159,519 A | * | 12/2000 | White et al. ................ 426/510 |
| 6,287,626 B1 | * | 9/2001 | Fox ........................... 426/615 |
| 6,428,831 B1 | | 8/2002 | Brown |

(Continued)

FOREIGN PATENT DOCUMENTS

EP 0129235 A2 12/1984

(Continued)

OTHER PUBLICATIONS

Briees Ingredients Company, Insta Grains, http://www.briessingredients.com/bicig.htm, printed Mar. 4, 2004, copyrighted 2002.

(Continued)

*Primary Examiner*—Drew E Becker
(74) *Attorney, Agent, or Firm*—Arlene L. Hornilla; Aleya Champlin; Paul Haun

(57) ABSTRACT

A steam crushed whole grain for reducing the wetting time necessary prior to use of a whole grain baking ingredient in a baking application. A whole grain kernel is formed into a whole grain flake with a plurality of exterior fractures. As the flake is formed, the flake is exposed to steam such that an interior starch portion of the flake is heated by penetration of the steam through the fractures. As the interior starch portion is heated, the flake is partially gelatinized within a range of about 15% to about 35%. The partially gelatinized grain is then milled and crushed for use as a baking ingredient. Prior to use, the partially gelatinized whole grain baking ingredient is wetted for a time less than 4 hours as is typically recommended for traditionally processed whole grains.

11 Claims, 4 Drawing Sheets

U.S. PATENT DOCUMENTS

| | | | |
|---|---|---|---|
| 6,491,959 B1 * | 12/2002 | Chiang et al. | 426/560 |
| 6,586,028 B1 | 7/2003 | Brown | |
| 6,586,036 B1 * | 7/2003 | Guraya | 426/627 |
| 6,818,240 B2 * | 11/2004 | Brubacher et al. | 426/496 |
| 2004/0022928 A1 * | 2/2004 | Derks | 426/630 |
| 2005/0136173 A1 * | 6/2005 | Korolchuk | 426/622 |

FOREIGN PATENT DOCUMENTS

| | | |
|---|---|---|
| EP | 0129235 A3 | 2/1986 |
| EP | 0129235 B1 | 9/1987 |
| WO | WO 86/05953 | 4/1986 |

OTHER PUBLICATIONS

Knehr, Food Product, Going With the Grain, http:/www.foodproductdesign.com/archive/1998/0698AP.html, Jun. 1998, pp. 1-8.

U.S. Food and Drug Administration, http://www.accessdata.fda.gov/scripts/cdrh/cfdocs/cfcfr/CFRSearch.cfm?FR=137.195&st=..., Title 21, vol. 2, Sec. 137.195, Apr. 1, 2003.

* cited by examiner

STEAM CRUSHED WHOLE GRAINS

REFERENCE TO RELATED APPLICATIONS

This application claims the benefit of priority under 35 U.S.C. 119(e)(1) of a provisional patent application Ser. No. 60/557,605, filed Mar. 30, 2004, which is incorporated herein by reference in its entirety.

FIELD OF THE INVENTION

The invention relates generally to whole grains for baking, particularly to methods and processes for processing whole grains for use in a baking application.

BACKGROUND OF THE INVENTION

For centuries, grains have been grown and harvested as one of the most basic food staples. Grains including corn, wheat, rye, oats and others are traditionally ground into flour for use as the main building block for making a variety of baked goods including breads, pastas, tortillas and dessert items.

Regardless of the grain type, the individual grain kernels comprise a fibrous exterior shell referred to as bran, an interior starch portion called the endosperm, and a nutrient-rich core called the germ. During milling of the grain kernels, processes can be used to separate and remove the bran and germ from the endosperm resulting in a refined grain that is almost pure starch. While refined grains have advantages such as appearance and consistency, health studies have suggested that diets high in starches, like those from refined grains, play a role in certain unhealthy conditions such as obesity, heart disease and diabetes among others. Conversely, many of these same studies have indicated that the use of whole grains or grains that contain the entire kernel including the bran, endosperm and germ, promote certain health advantages.

One reason suggested for the health advantages associated with whole grains is that the bran and germ are both the nutrient-rich portions of the grain kernel and include concentrated portions of essential vitamins and nutrients. Further, the fibrous make-up of bran provides an excellent source of dietary fiber. Studies have shown that diets rich in whole grains can reduce the risks of heart disease, diabetes and certain cancers. Furthermore, other studies have suggested that individuals who consume whole grains tend to eat less and as a consequence, may weigh less or lose weight. In addition to the health benefits, the use of whole grains, for example in bread, is easily identifiable in the flour and consequently the bread is not a homogenous mixture. Since individual whole grain pieces are visibly identifiable and texturally distinguishable by the consumer, the mixture provides the appearance of a healthier alternative.

While the use of whole grains in baking provides numerous health benefits, these same whole grains require time-consuming preparation techniques to make appealing baked goods. In order to use whole grains in traditional baked goods, the whole grains must be soaked in water for 4-8 hours prior to baking. Otherwise, the whole grains will tend to absorb the water from the surrounding ingredients during the baking process such that the finished product has "hard" and/or "dry" regions that can negatively affect the quality of the baked good. Having to soak whole grains for extended periods of time (4 hours or more) substantially increases preparation time and reduces the throughput of the baked goods.

One approach that has been utilized to avoid the extended soaking time for whole grains is to instantize the grain during the milling process. Instantizing grain involves the process of heating grain kernels such that the internal starch of the endosperm is greater than 75% gelatinized. Gelatinization of starch refers to a process of creating fractures within the individual starch granules such that water or moisture has a point of entry and can be absorbed quickly by the starch granules. An example of an instantized grain is "instant oatmeal" that immediately absorbs hot water and takes on a pasty consistency. Typically, the process of instantizing grain consists of exposing grain kernels to an infrared heat source such that the internal moisture, typically at least 13% by weight, of the grain kernels, is quickly converted to steam which subsequently bursts or cracks the individual starch granules. While instant grains can be used to reduce the overall soak period of whole grains, instant grains suffer from the drawback that when exposed to water, the starch granules basically disintegrate due to their high gelatinization and the granules become indistinguishable in both appearance and texture to a consumer of the baked good.

As such, it would be advantageous to have a whole grain product that is identifiable to the consumer as a whole grain that includes all of the desirable health characteristics associated with whole grains and can be used in a baked good without the need to subject the whole grain to hours of pre-soak.

SUMMARY OF THE INVENTION

The present invention addresses the aforementioned needs of providing a whole grain product that substantially reduces the soaking time prior to baking while maintaining the visual and textural characteristics associated with whole grain. A crushed whole grain of the invention is rolled to form exterior fractures in the grain kernel. At the same time, the fractured kernel is exposed to steam that gelatinizes a portion of the interior starch. By partially gelatinizing the crushed grain, the time associated with water absorption in the bread dough pre-preparation stage is substantially reduced as compared to traditionally processed whole grains.

In one embodiment, the invention comprises a process for creating a crushed grain bakery ingredient having increased water absorption capabilities.

In another embodiment, the invention comprises a bakery ingredient comprising visually identifiable crushed whole grain and grain fines wherein both the crushed whole grain and the grain fines are partially gelatinized prior to incorporation into the bakery ingredient to promote increased water absorption.

In another embodiment, the invention comprises an intermediate, partially gelatinized whole grain flake suitable for further processing into a whole grain bakery ingredient.

The above summary of the various embodiments of the invention is not intended to describe each illustrated embodiment or every implementation of the invention. The figures in the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
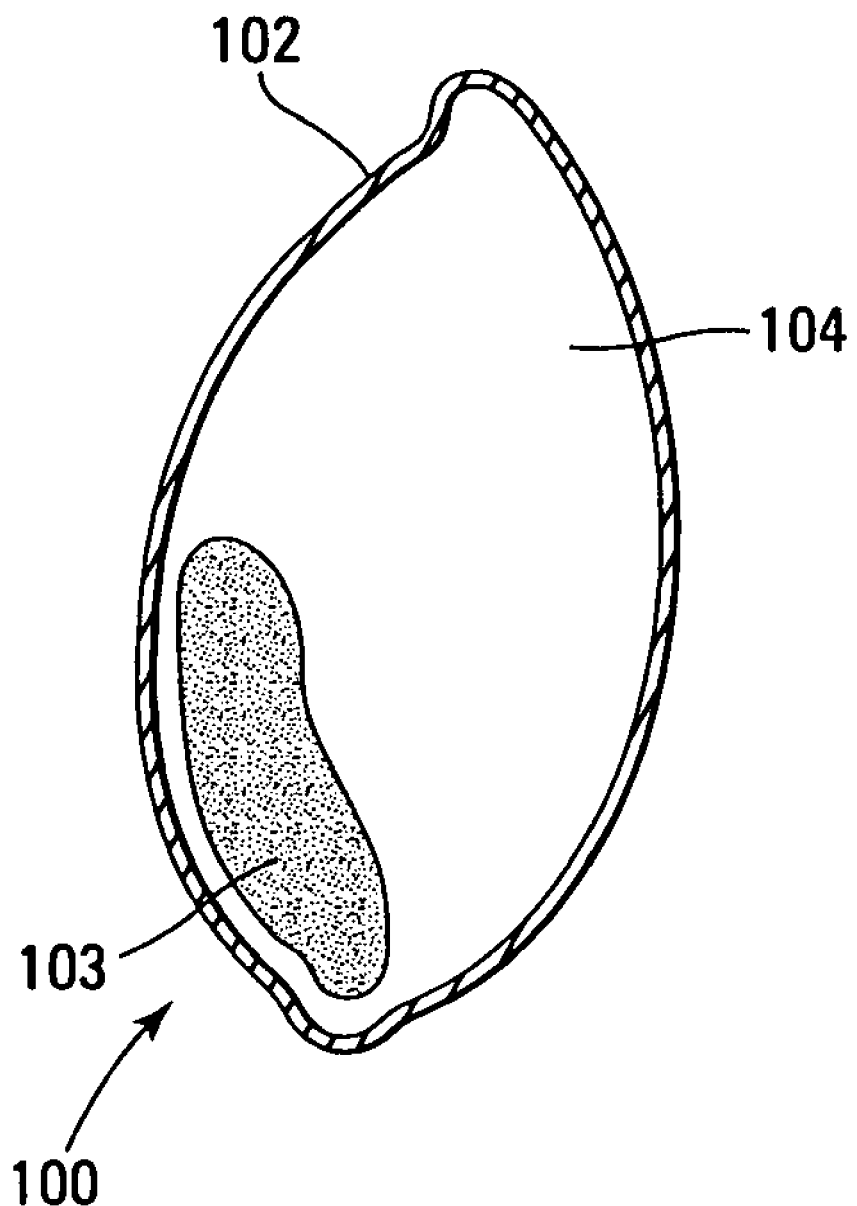
FIG. 1 is a section view of a whole grain kernel.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

As illustrated in FIG. 1, a whole grain kernel 100 comprises a hard outer shell 102 called bran, a nutrient-rich core 103 called germ and an interior starch portion 104 called endosperm. The composition of whole grain kernel 100 is representative of kernels from grain including wheat, rye, oats, barley, corn and triticale.

Figure 2:
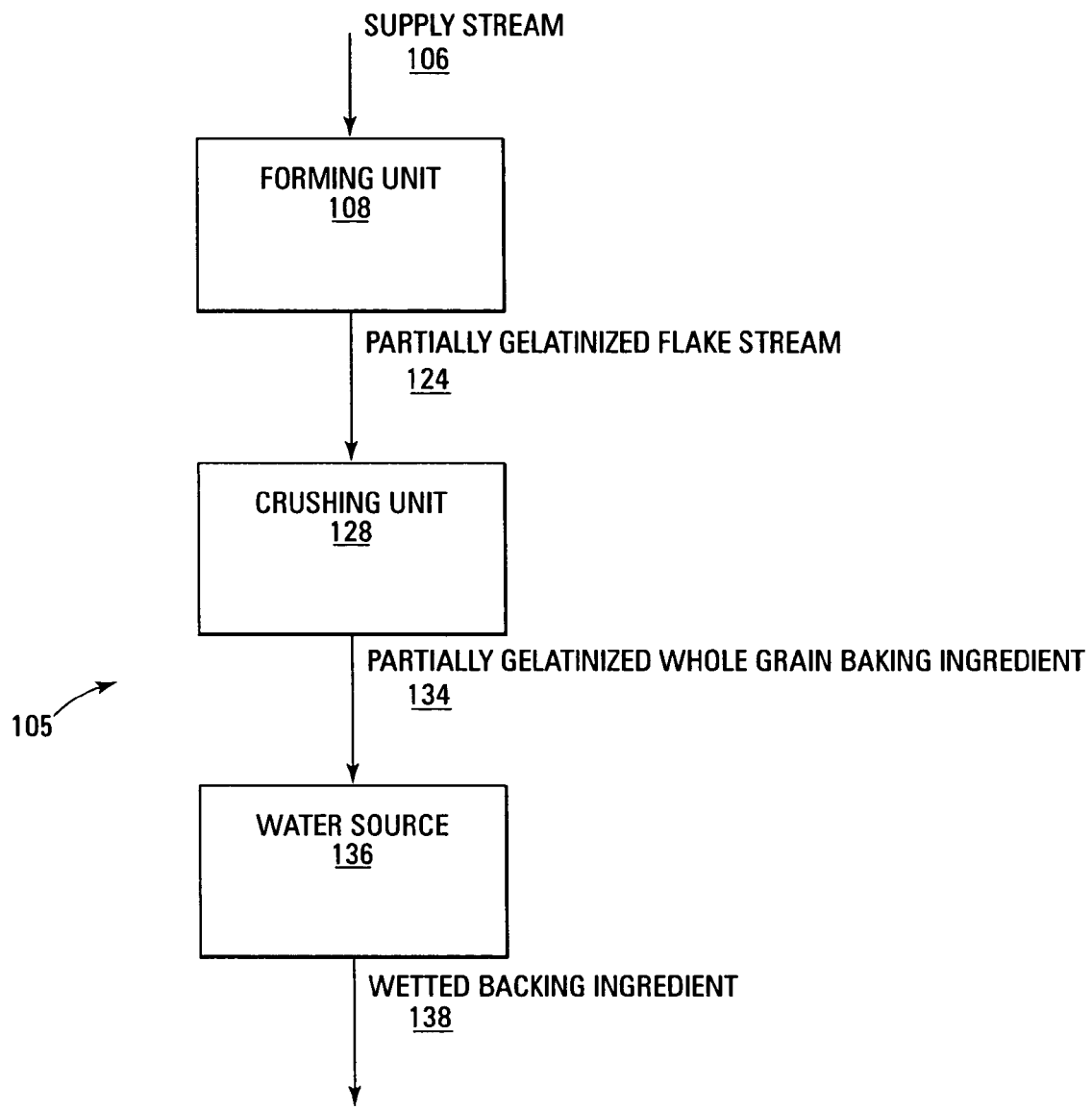
FIG. 2 is a process schematic for a process for milling and wetting a partially gelatinized crushed whole grain according to an embodiment of the invention.

Referring to FIG. 2, there is illustrated a process 105 for milling a partially gelatinized crushed whole grain according to an embodiment of the invention. Supply stream 106 consisting of an amount of whole grain kernels 100 is fed to a forming unit 108. Typically, supply stream 106 has a supply moisture content of about 11% to about 14% and a temperature of about 220° F., dependent primarily upon harvesting conditions. If the whole grain kernels 100 are harvested with a moisture content higher than about 14%, a farmer may use a drying process to reduce the moisture content to about 13%. In some instances, this drying process/can cause the supply stream 106 to be up to 5% gelatinized prior to being fed to forming unit 108.

Figure 3:
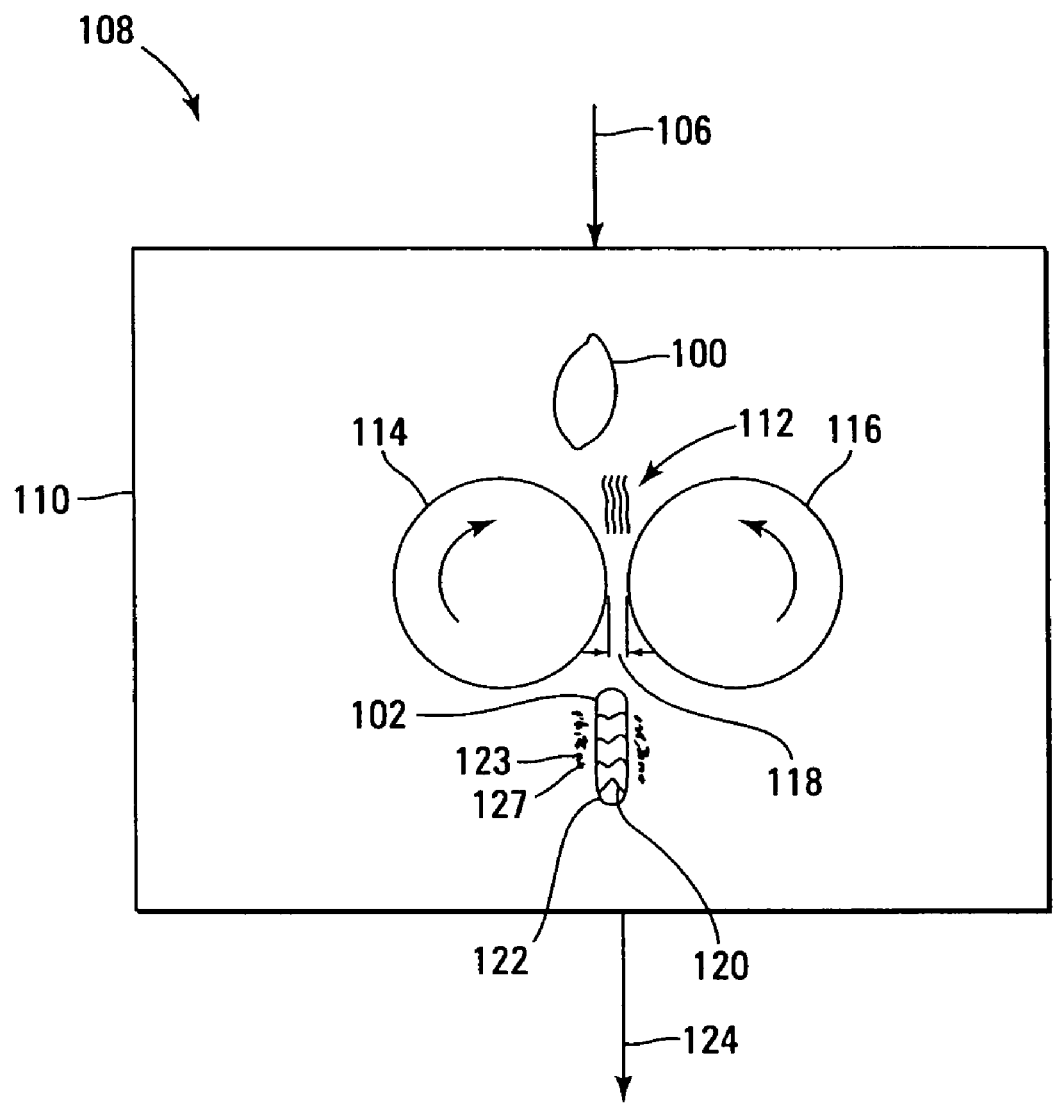
FIG. 3 is a schematic view of a forming unit used in the process depicted in FIG. 2.

As shown in FIG. 3, forming unit 108 can comprise a roller unit 110 and a supply of steam 112. In one embodiment illustrated in FIG. 3, roller unit 110 comprises a first roller 114 and a second roller 116 in a side-by-side orientation separated by a roller gap 118. First roller 114 is a smooth roller while second roller 116 is a corrugated roller. First roller 114 and second roller 116 rotate in opposed directions, for example first roller 114 rotates in a clockwise direction and second roller 116 rotates in a counterclockwise direction as indicated in FIG. 3 such that supply stream 106 is drawn through first roller 114 and second roller 116. Supply stream 106 is fed into the top of forming unit 108 whereby the whole grain kernels 100 drop through roller gap 118. First roller 114 and second roller 116 can be adjustably positioned such that roller gap 118 is less than the diameter of the whole grain kernels 100 whereby the whole grain kernels 100 are fractured and flattened, creating exterior fractures 120 within the hard outer shell 102. At substantially the same time whole grain kernels 100 are fractured and flattened, whole grain kernels 100 are exposed to steam 112. Steam 112 penetrates exterior fractures 120 causing the moisture content within whole grain kernels 100 to increase and approach about 20%. The penetration of steam 112 causes interior starch portion 104 to heat up. In areas of interior starch portion 104 that reach a temperature of about 190° F. to about 210° F., interior starch portion 104 begins the process of gelatinization, whereby the individual starch granules that make up interior starch portion 104 begin to experience individual starch fractures. In this example embodiment, whole grain kernels 100 are in contact with steam 112 for up to 5 seconds such that about 15% to about 35% of the individual starch granules that comprise interior starch portion 104 are gelatinized.

Referring again to FIG. 3, once whole grain kernels 100 fall through first roller 114 and second roller 116, the grain has been compressed to form a partially gelatinized, whole grain flake 122. In addition to forming whole grain flakes 122, first roller 114 and second roller 116 create a small amount (e.g., 20% or less) of grain fines 123 consisting generally of ground flour having a particle size less than 45 mesh, i.e., ground flour that passes through a U.S. Standard #45 screen. As grain fines 123 are created, grain fines 123 are also exposed to steam 112. Fines 123 comprise ground versions of whole grain flake 122. Within fines 123, a larger percentage of the interior starch portion 104 is exposed to steam 112 such that a larger percentage of grain fines 123 reach the gelatinization temperature of 198° F. As such, a larger percentage of the individual starch granules, about 50% to about 65% of the individual starch granules present within grain fines 123, are gelatinized to form a partially gelatinized grain fine 127.

Once whole grain flakes 122 and partially gelatinized grain fines 127 are removed from exposure to steam 112, interior starch portion 104 begins to cool such that further gelatinization is avoided. A partially gelatinized flake stream 124, comprising whole grain flakes 122 and partially gelatinized grain fines 127, can then be fed to a crushing unit 128, which may include a gravity feed or an air conveyor. As flake stream 124 is transferred to crushing unit 128, whole grain flakes 122 and the partially gelatinized grain fines 127 can dry such that flake stream 124 has a moisture content of less than about 20%.

Figure 4:
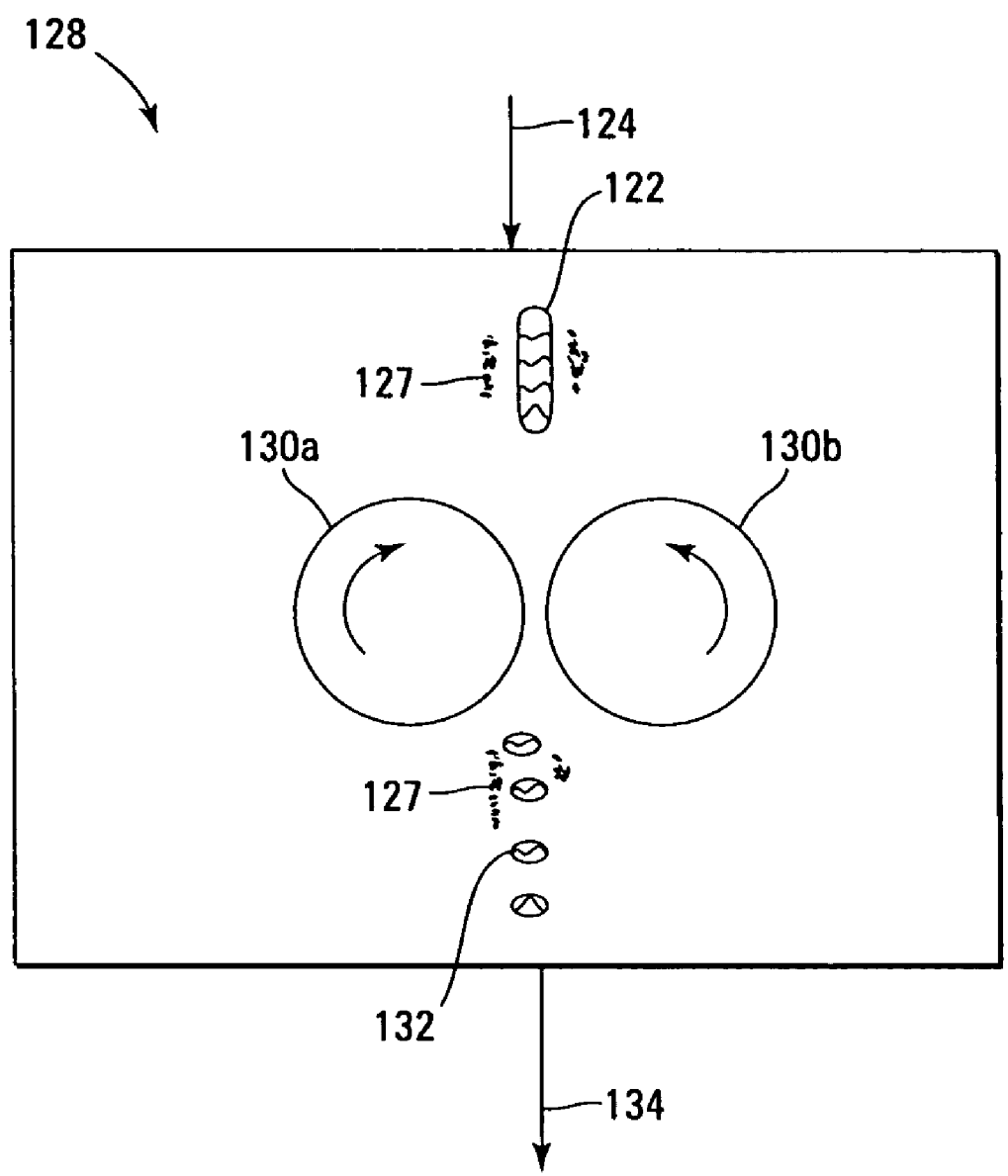
FIG. 4 is a schematic view of a crushing unit used in the process depicted in FIG. 2.

Referring now to FIG. 4, within crushing unit 128, whole grain flakes 122 are crushed between a pair of crushing rollers 130a, 130b to form a visually identifiable crushed whole grain 132 suitable for use in a baking product. Crushed whole grain 132 meets the size specifications for crushed wheat as defined by the United States in Title 21 of the Code of Federal Regulations (21 CFR 137.195). Crushing roller 130a can include crushing points vertically disposed to a crushing gap while crushing roller 130b can include crushing points horizontally disposed to the crushing gap. Due to their already small size, partially gelatinized grain fines 127 can generally pass through crushing rollers 130a and 130b without undergoing significant crushing. Visually identifiable, crushed whole grain 132, on the order of about 80% by weight, and partially gelatinized fines 127, on the order of about 20% by weight, combine to form a partially gelatinized, whole grain baking ingredient 134. The partially gelatinized, whole grain baking ingredient 134 has a moisture content of about 13% and is subsequently air conveyed to a packaging or distribution location. The partially gelatinized, whole grain baking ingredient 134 includes all of the components of whole grain kernel 100 including hard outer shell 102, nutrient rich core 103 and interior starch portion 104, wherein about 15% to about 35% of the individual starch granules within crushed whole grain 132 has been gelatinized while about 50% to about 60% of the individual starch granules within partially gelatinized grain fines 127 have been gelatinized. The partially gelatinized whole grain baking ingredient 134 is now ready for use in any of a variety of baking applications in which the use of whole grains is desired.

Referring back to FIG. 2, prior to its use in a baking application, partially gelatinized whole grain baking ingredient 134 is wetted with a water source 136. Unless wetted prior to baking, partially gelatinized whole grain ingredient 134 will absorb water from the other baking components resulting in the formation of dry and/or hard portions within the finished baked good. As described previously, the wetting of traditional crushed whole grains can last for 4 hours or more. However, an embodiment of the invention substantially reduces this pre-soak time.

For example, in one embodiment, a crushed whole grain ingredient 134 comprising crushed whole grain 132 (and optionally partially gelatinized grain fines 127) can be wetted by water source 136 to reach about a 90% moisture content by weight of the crushed whole grain ingredient 134 within about 60 minutes of being wetted by water, to form wetted baking ingredient 138.

In another embodiment, the crushed whole grain ingredient 134 can reach a moisture content of about 90% by weight of the crushed whole grain ingredient within about 20 minutes of being wetted by water source 136.

In a third embodiment, the crushed whole grain ingredient 134 can reach a moisture content of about 90% by weight of the crushed whole grain ingredient 134 within about 5 minutes of being wetted by water source 136.

EXAMPLE 1

Comparison was conducted between a traditionally processed crushed whole grain and partially gelatinized whole grain baking ingredient 134 resulting from an embodiment of the invention. For comparison, 100 grams of each grain sample was soaked. For the traditionally processed whole grain, a 100 gram sample absorbed 90 mL of water within 5 minutes and 113 mL of water after soaking for 4 hours. In comparison, a 100 gram sample of partially gelatinized whole grain baking ingredient 134 absorbed 113 mL of water within 5 minutes to form a wetted baking ingredient 138. The increased water absorption properties of the partially gelatinized whole grain baking ingredient 134 appears to result from the increased ability of the gelatinized starch granules to absorb water through the fractures in the individual starch granules. As such, the use of partially gelatinized whole grain baking ingredient 134 of this example embodiment of the invention results in a reduction of wetting times by about 98%.

By reducing the wetting times, the cost and expense associated with increased wetting times can be eliminated and the cycle time of the whole grain baking process is significantly reduced without affecting the taste and quality of the finished baked product. In addition, the consumer can identify the baked product as being a whole grain product by visually and texturally identifying the visually identifiable, crushed whole grain 132 within the product.

Although various embodiments of the present invention have been disclosed here for purposes of illustration, it should be understood that a variety of changes, modifications and substitutions may be incorporated without departing from either the spirit or scope of the present invention.

I claim:

1. A process for preparing a wetted whole grain ingredient for use in a food product comprising:
    providing a crushed whole grain ingredient having a starch portion comprising about 15% to about 35% gelatinized starch granules; and
    wetting the crushed whole grain ingredient in a water source such that water in an amount greater than about 90% by weight of the crushed whole grain ingredient is absorbed within about 60 minutes of being wetted by the water source.

2. The process of claim 1, wherein the water in an amount greater than about 90% by weight of the crushed whole grain ingredient is absorbed within about 20 minutes of being wetted by the water source.

3. The process of claim 1, wherein the water in an amount greater than 90% by weight of the crushed whole grain ingredient is absorbed within about 5 minutes of being wetted by the water source.

4. The process of claim 1, wherein the crushed whole grain ingredient includes an amount of grain fines, wherein the grain fines have a starch gelatinization range from about 50% to about 65%.

5. A process for preparing whole grains for use in a food product comprising:
    contacting whole grain kernels being conveyed within a conveyor with steam;
    forming a steam treated flake while the whole grain kernels are in contact with the steam such that an interior starch portion of the steam treated flake is partially gelatinized within a gelatinization range of about 15% to about 35%;
    crushing the steam treated flake to form a partially gelatinized crushed whole grain; and
    wetting the partially gelatinized crushed whole grain in a water source such that water in an amount greater than about 90% by weight of the crushed wholegrain is absorbed within about 60 minutes of being wetted by the water source.

6. The process of claim 5, wherein forming the steam treated flake consists of rolling the whole grain kernel.

7. The method of claim 6, wherein rolling the whole grain kernel comprises rolling with a corrugated roller, wherein the corrugated roller flattens and fractures the whole grain kernel to form the steam treated flake.

8. The method of claim 7, wherein the steam penetrates the fractured whole grain kernel such that an interior starch portion reaches a temperature of at least 198° F.

9. The method of claim 7, wherein the steam treated flake has an internal moisture content less than 20%.

10. The process of claim 5, wherein the moisture content of the partially gelatinized crushed whole grain reaches about 90% within about 20 minutes.

11. The process of claim 10, wherein the moisture content of the partially gelatinized crushed whole grain reaches about 90% within about 5 minutes.

* * * * *